Dec. 14, 1965   A. ZIEGLER   3,223,589
REGULATING METHOD AND APPARATUS FOR NUCLEAR REACTORS
Filed Jan. 26, 1961   5 Sheets-Sheet 1

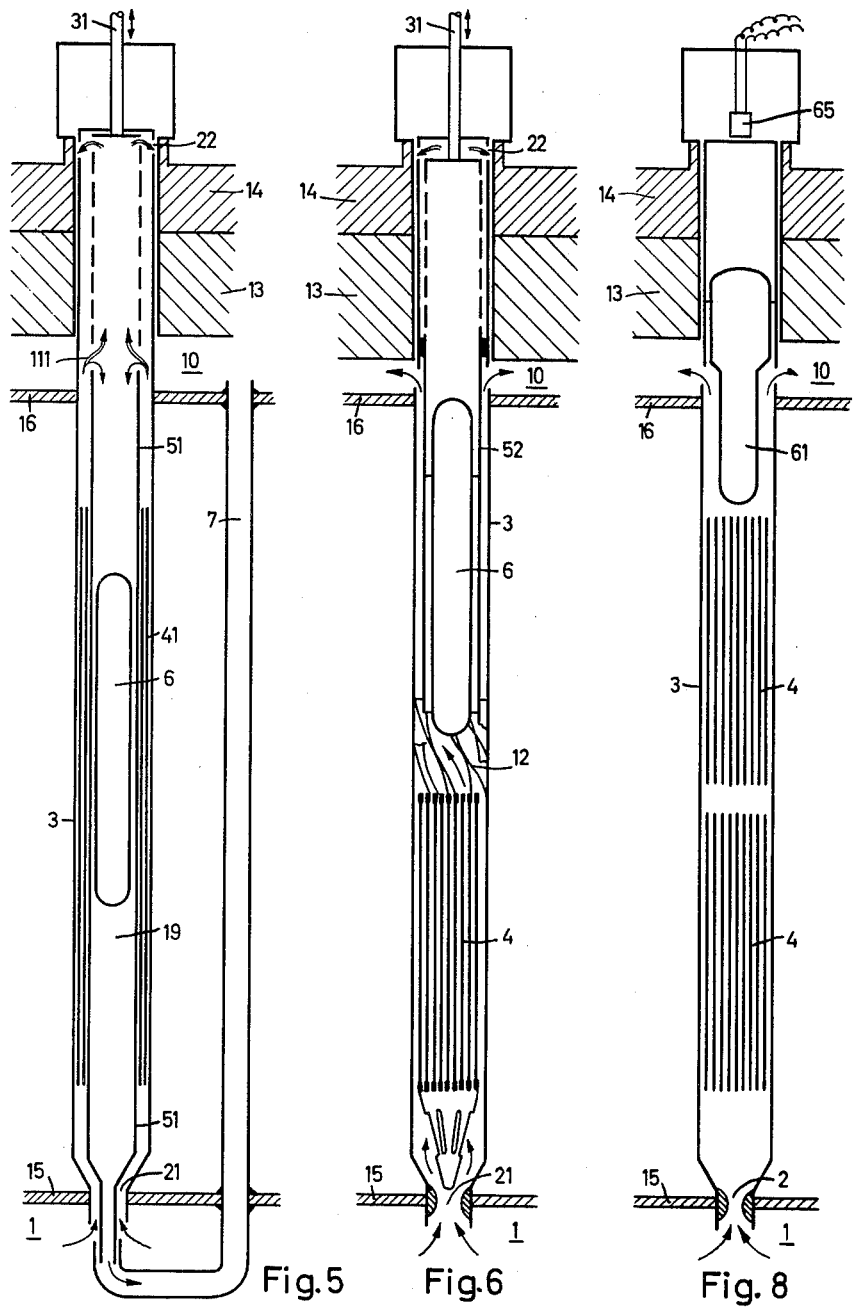

Dec. 14, 1965 A. ZIEGLER 3,223,589
REGULATING METHOD AND APPARATUS FOR NUCLEAR REACTORS
Filed Jan. 26, 1961 5 Sheets-Sheet 5

United States Patent Office 3,223,589
Patented Dec. 14, 1965

3,223,589
REGULATING METHOD AND APPARATUS FOR NUCLEAR REACTORS
Albert Ziegler, Erlangen, Germany, assignor to Siemens-Schuckertwerke Aktiengesellschaft, Berlin-Siemensstadt, Germany, a corporation of Germany
Filed Jan. 26, 1961, Ser. No. 85,106
Claims priority, application Germany, Jan. 30, 1960, S 66,861
20 Claims. (Cl. 176—22)

My invention relates to methods and apparatus for regulating the operation of nuclear reactors.

In some types of reactors, an increase in power generation may effect an increase in reactivity, thus releasing an accelerated further increase in power. Such an instable behavior is encountered, for example, with heavy-water moderated power reactors if they have a positive bubble coefficient, a condition unfortunately obtaining just in the range of optimal rating for power generation. Other types of reactors, mainly homogeneous and light-water moderated reactors, exhibit the inverse tendency of "inherent stability." Such stability is desirable for safety reasons. It also simplifies the regulation requirements as the reactor adjusts itself to a predetermined temperature level and tends to remain at that level despite major disturbances.

It is among the objects of my invention to devise methods and means for the operation of nuclear reactors so as to secure an inherently stable regulatory behavior with reactors originally of the instable type.

Another object of my invention, also relating to reactors of the inherently stable types, is to simplify the mechanism of the control rods or the like neutronic absorber means heretofore used for reactor regulation, and to render the automatic regulation less susceptible to trouble. In accordance with a feature of my invention, I control the regulatory motion of displaceable regulating elements in the reactor by a boiling operation occurring in a selected liquid-cooled nuclear fuel unit or element of the reactor.

As a result, the heretofore very complicated driving and control system for the operation of control rods can be substituted by considerably simpler devices which do not require electronic control circuits and for that reason eliminate a considerable source of trouble.

The foregoing and more specific objects, advantages and features of my invention, said features being set forth with particularity in the claims annexed hereto, will be apparent from, and described in, the following with reference to the embodiments of nuclear-reactor regulating devices according to the invention illustrated by way of example on the accompanying drawings in which:

FIGS. 1 through 6 illustrate schematically and in section six different regulating devices.

FIGS. 8 and 9 show schematically and in vertical section two further embodiments of regulating apparatus.

The same reference characters are used in all illustrations for functionally corresponding components respectively.

Figure 1:
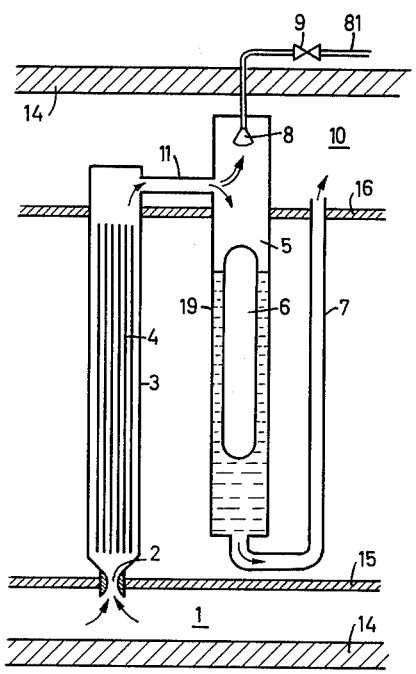

FIG. 1 shows a portion of a nuclear reactor core which comprises top and bottom walls 14 of the pressure tank, as well as the wall portions 15 and 16 of the moderator vessel which, together with the tank walls 14 form intermediate plenum chambers 1 and 10 for the supply of coolant and the collection of heated coolant respectively. Inserted into the moderator vessel, in the known and industrially used manner, is a separating tube 3 which constitutes only one of a number of parallel fuel tubes. Inserted in tube 3 is a fuel element 4 which is supplied from the lower plenum chamber 1 with coolant through a throttle passage 2.

The throttle opening is so adjusted that boiling takes place inside of tube 3 already at a fraction of the full rated power output of the reactor. In contrast to the cooling channels in the known reactors, however, the water-steam mixture does not issue from the fuel tube 3 directly into the plenum chamber 10 but passes through a pipe 11 to a steam chamber 5 in which the steam can separate from the water collecting in the bottom portion. A float 6 consisting of neutron absorber material or containing such material, operates as a regulator rod whose depth of immersion in the reactor core is determined by the level of the separated quantity of water 19. The collected water passes from chamber 5 through a pipe 7 of smallest applicable flow resistance into the outlet plenum chamber 10. Located in the top portion of the enclosure that forms the chamber 5 is a spray nozzle 8 by means of which relatively cool water can be sprayed into the chamber 5, for example from the coolant supply line, for the purpose of condensing the excessive amount of steam. The quantity of spray water is controllable from the outside by a valve 9 in the supply line 81.

The performance of this device when the reactor is being started up and during its steady-state operation will be described presently.

In cold condition of the reactor the entire volume of the fuel tube 3 and of the steam chamber 5 is filled with liquid water and the absorber float 6 is located at the top. When starting the charged reactor, it is made critical in the usual manner by pulling the shutdown and trimmer rods (not illustrated) out of the core and thus gradually running the reactor up to rated power. The throttle 2 is so adjusted, for example, that boiling in fuel tube 3 commences at about 20% of the rated full power. The evolving steam collects in the upper portion of chamber 5 and gradually presses the water level of the coolant 19 downwardly. This continues until a state of equilibrium is attained, namely until a sufficient amount of steam condenses to prevent further increase in pressure. The downward motion of the absorber float increases the amount of float immersion and thus causes the increasing power to reach a stationary point or to commence declining. This manifests itself on the outside of the reactor by the fact that the observing personnel finds that the power of the reactor no longer increases even if the trimmer rods are pulled further out of the reactor core. The power limiting effect continues only until the float reaches its lowermost position and is thus placed out of action. From this moment on, the steam mixed with water can reach the upper plenum chamber 10 without causing any damage to the reactor system. If now the trimmer rod is placed back to the previous position in which the float is just located in the middle of its regulating range, the reactor remains on this power level, for example 30% of the full rated power, without actuation of an external regulating rod, and automatically reestablishes this condition by a corresponding float displacement, even upon occurrence of disturbances.

When now coolant is injected through spray nozzle 8 by opening the valve 9, the steam in chamber 5 is partly condensed. Simultaneously, the pressure in the steam chamber somewhat declines. As a result, the throughput of coolant liquid through the fuel tube 3 is increased and the steam generation is somewhat reduced on the one hand, while on the other hand, despite the increased influx of water, the pressure difference through the outlet line 7 and hence the escape of water into the top plenum chamber 10 are reduced. This causes the water level with the absorber float 6 to rise immediately and to thereby reduce the neutron absorption. This effects an increase in reactivity and thus initiates an increase in power generated. The correspondingly increasing generation of steam counteracts the rise of the water level in steam chamber 5 until ultimately a state of equilibrium between steam generation and condensation is attained. The reactor then remains on this power level, and all disturbances are automatically equalized by slight motions of the float 6, provided the amount of coolant injected into the steam through nozzle 8 is kept constant.

By virtue of the above-described device, therefore, the reactor has an inherently stable performance. Of decisive significance for such behavior is the series connection of the pressure drops through the throttle 2 and through the boiling path, which makes it possible to obtain a pressure difference that continuously increases within the operating range in dependence upon the flow velocity of the coolant. Also significant for reliability and safety of reactor operation is the fact that the upward travelling speed of the absorber float 6 is limited. For this purpose, the weight of the float is so rated that only a small volume of the float protrudes above the coolant level. If the coolant level rises rapidly, the float 6 becomes completely flooded and follows only slowly because its buoyant acceleration is small relative to its mass inertia. However, when the coolant level drops rapidly, the float follows instantaneously, i.e., at the maximum speed determined by gravity acceleration. The reduction in reactor power, therefore, takes place rapidly and with slight inertia, whereas an increase in power can occur only slowly and with delay. For this purpose, it is preferable to keep the time constant of heat conductance within the fuel elements in the boiling zone as low as feasible, for example by inserting metallic elements.

Figure 2:
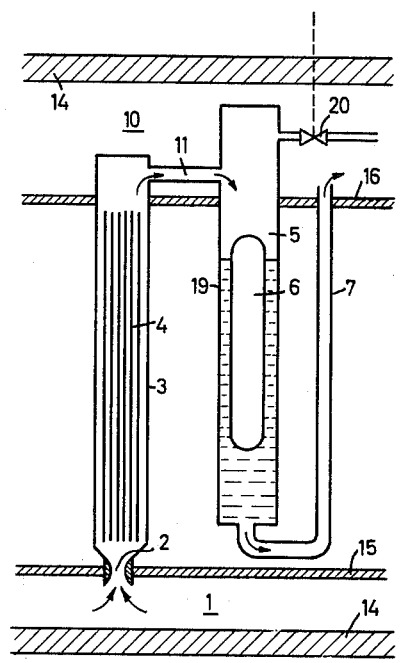

The device illustrated in FIG. 2 is fundamentally similar to the one described above with reference to FIG. 1 but differs in that the spray nozzle 8 of FIG. 1 is eliminated. In lieu thereof the steam chamber 5 is provided with a controllable steam outlet which comprises a valve 20 adjustable from the outside of the reactor. The controllable steam outlet at 20 also permits reducing the pressure in chamber 5 for obtaining the same results as by the additional condensation of steam by coolant injection through nozzle 8 according to FIG. 1.

Another possibility of controlling the power generation of the reactor is to vary the effective flow cross section of the throttle 2, as exemplified by the embodiments shown in FIGS. 6 and 8. In order to attain with such a device the greatest possible range of variation, it is preferable to combine a power control of this type with a steam-pressure control device as represented by the injection nozzle 8 in FIG. 1 and the steam-outlet valve 20 in FIG. 2.

Figures 3, 4:
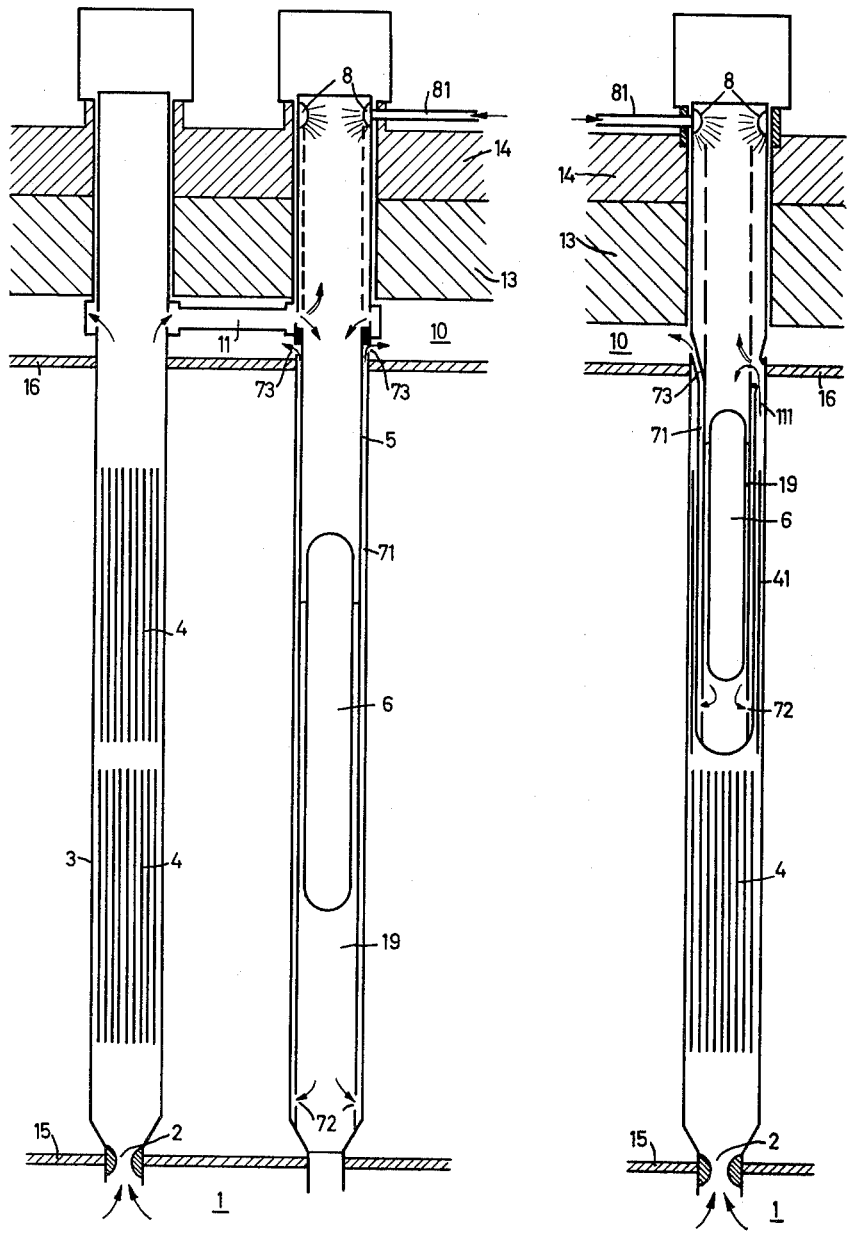

In the device shown in FIG. 3, two fuel elements 4 are located one above the other in the fuel tube 3. The water-steam mixture generated in tube 3 passes through a connecting pipe 11 into a double-walled steam chamber 5 which extends vertically through the reactor core in form of a double-walled tube. Mounted in the top end of the inner tube are the spray nozzles 8 of the above-mentioned type which are connected to the coolant supply line 81. The connecting pipe 7 shown in FIG. 1 is substituted in FIG. 3 by the annular interspace 71 between the inner and outer wall of the steam-chamber tube. The cooling liquid enters through openings 72 in the lower end of the inner tube 5 and into the annular interspace 71. The liquid coolant issues through openings 73 at the upper end of the inner tube to pass into the top plenum chamber 10.

A still more compact combination of the individual structural elements is involved in the device according to FIG. 4. In this device, the steam chamber and the absorber float 6 are located in the same tube 3' as the fuel element 4. Located above the normal element 4 is tubular fuel element 41 which, like the element 4, consists of enriched uranium or other fissionable nuclear fuel material. The tubular fuel element 41 surrounds the steam chamber which is similar to the one shown in FIG. 3. The coolant enters into the top plenum chamber 10 through a ring-shaped gap 73 of the double-walled tube, this gap being interrupted by tubular openings 111 which permit the steam-water mixture to enter from the fuel space into the steam chamber.

The device according to FIG. 5 also comprises the steam chamber and the fuel element within a single coolant channel. In comparison with the device of FIG. 4, the regulating range of the absorber float 6 is increased by the use of exclusively tubular fuel elements 41. Located within the hollow of the tubular fuel element 41 is a tube 51 whose interior forms the steam chamber. The upper end of tube 51 has lateral bores 111 through which the water-steam mixture passes from the boiling space above the fuel element 41. The tube 51 is longitudinally displaceable by means of a rod 31 driven from the outside of the reactor. Such axial displacement has the effect of changing the adjustment of the throttle 21 mounted on the lower bottom of the moderator tank. The throttle 21 is formed by a conical portion of the fuel tube 3 and a mating portion of the inner tube 51. As in the embodiments of FIGS. 1 and 2, a pipe 7 serves for returning the condensate to the upper plenum chamber 10. If desired, the connecting pipe 7 can be eliminated by providing a jacket tube around the fuel tube 3 in the same manner as explained above with reference to FIG. 3. Such modification is readily applicable because the flow resistances in a device according to FIG. 5 can be kept within particularly small limits.

As mentioned, the device according to FIG. 6 is provided with an adjustable throttle 21. The adjustment is effected from below by means of a control rod 31'. In this case only one-half of the regulating range of an individual absorber float is utilized and the steam chamber, formed by a tube 52, is completely open. The performance of this device is determined by a centrifugal separator 12 which separates steam from water so that the steam in the middle zone, within the condensate located in the tube 52, will bubble upwardly past the absorber float 6 and passes in part through a regulatable opening 22 into the upper plenum chamber 10. The amount of water coming from the centrifugal separator 12 passes directly into the plenum chamber 10 through the annular interspace between the fuel tube 3 and the inner tube 52.

In the embodiment so far described, only one absorber float is shown for simplicity. However, any desired number of float-receiving tubes can be analogously accommodated within the reactor core and communicate with the steam chamber proper. Then the respective absorber floats are always located at the same height as the absorber float in the steam chamber proper. Only the latter chamber need be provided with pressure regulating means such as the above-described spray nozzles or steam-outlet valves, in order to maintain in all interconnected communicating tubes the same liquid level and hence the same immersing depth of the absorber floats within the reactor core.

Figure 7A:
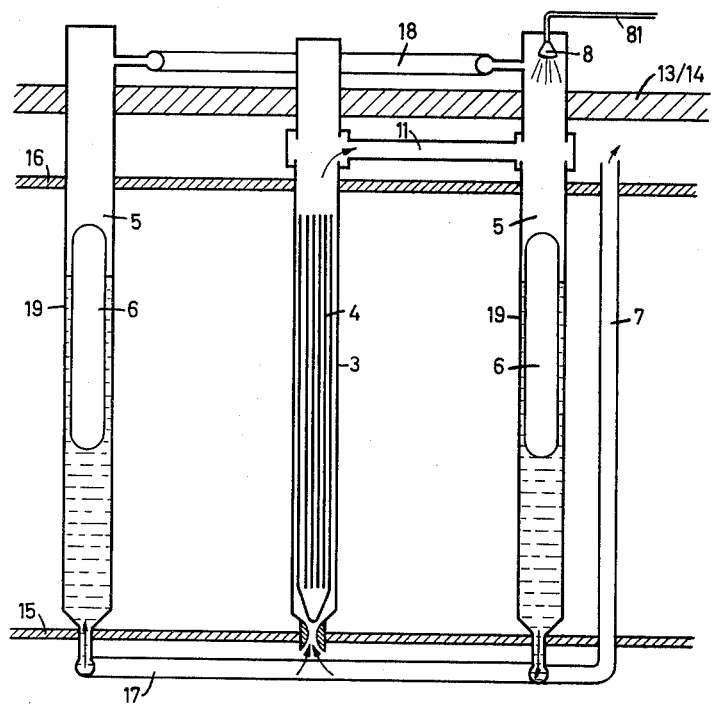
FIG. 7a shows schematically and in vertical section a lateral view of another reactor regulating device.
Figure 7B:
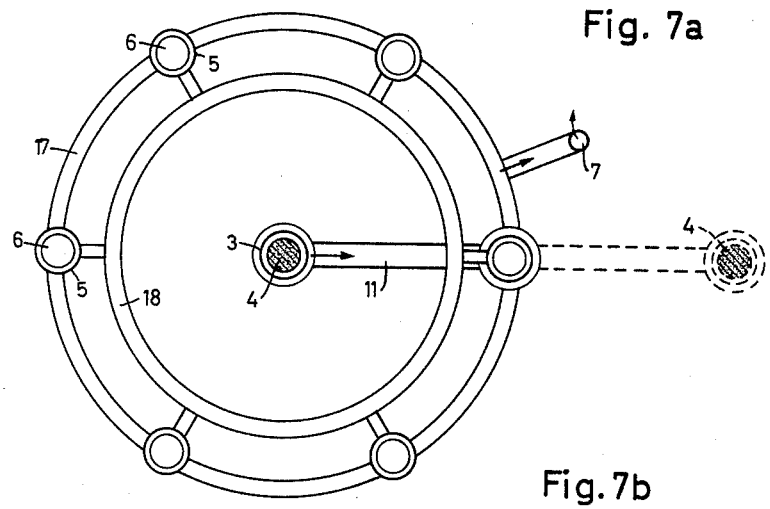
FIG. 7b is a top view of the same device.

A reactor embodying the just-mentioned features is illustrated in FIGS. 7a and 7b. The steam-generating fuel element 4 is shown located in the center of a concentric arrangement of intercommunicating tubes, each comprising an absorber float 6, although it will be understood that the fuel element 4 may also be located eccentrically to the arrangement of communicating tubes, or may be located outside of such arrangement. The float-accommodating tubes communicate with each other through a lower ring conduit 17 and an upper ring conduit 18. If desired, the steam-generating fuel element may be mounted at a place near the edge of the reactor core because, by corresponding choice of the coolant and its flow velocity, a predetermined boiling condition can also be obtained at such other location. It is also possible, according to FIG. 9, to locate the steam chamber proper, namely the chamber where the adjustment of the steam pressure is effected, outside of the reactor core proper. Such an arrangement of the steam chamber whose pressure determines the height of the liquid level, is particularly favorable because it facilitates mounting and operating the steam-pressure control means such as the spray nozzle 8 or the steam-outlet valve 20. In this case, and as shown in FIG. 9, a floating control element need not necessarily be provided within the steam chamber proper.

Figure 9:
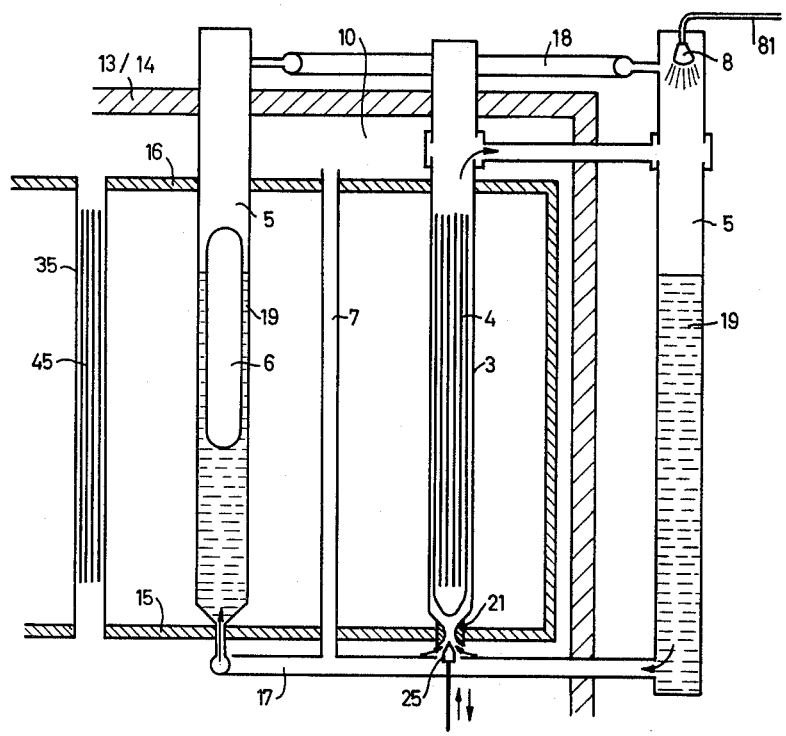

According to FIG. 9, the pressure tank 14 and the thermal shield 13 of the reactor are shown to constitute a single structural component 13/14. The flow cross section of the nozzle 21 is changed by means of a conical valve body 25 actuable from the outside. Also shown in FIG. 9 is a normal coolant channel 35 with fuel elements 45 located therein. As a matter of fact, only one or a few of the fuel elements of the reactor need be located in a regulating device according to the invention, whereas the rest of the nuclear reactor core need not participate in the regulating operation but may be given any conventional design.

The above-described embodiments illustrate the fact that the invention can be embodied in a great variety of structural devices, all performing fundamentally the method according to the invention. It will also be understood that regulating devices according to the invention, such as those described above, can be used virtually with any reactor types, any type of coolant and any type of operation of the other fuel elements. For example, the regulating device according to the invention is applicable with a boiling coolant liquid, with non-boiling coolants, as well as with reactors operating with gaseous coolants. It is merely necessary to provide such reactors with a separate liquid-cooled fuel element for the purpose of steam generation. Devices according to the invention, furthermore, are not limited to the use of water as coolant, but are also suitable for reactor operation with other applicable boiling liquids, for example organic coolants.

Aside from regulating the reactor performance, the principles of my invention can also be used for indicating the commencement of boiling in particularly endangered fuel elements of reactors. For this purpose, suitable signalling or sensing devices, actuable by the float or floats may be added. For example the embodiment shown in FIG. 8 comprises a regulating device which also operates as a protective apparatus for the prevention of boiling. As soon as boiling commences, the float 61, preferably consisting of neutron-absorbing material, moves away from a magnetic sensor device 65. This causes an indicating device to respond outside of the reactor. The float then becomes immersed into the reactor core and thus causes an immediate damping of reactivity. Such sensing devices can also be arranged in other locations of the steam chamber or one of the tubes communicating therewith, so that the normal regulating performance of the absorber elements can be directly supervised from the outside.

In lieu of the solid absorber elements mentioned in the foregoing, the method of the invention can also be performed with liquid absorber elements. Such liquid absorber elements may consist of substances which do not mix with the boiling medium, which do not evaporate as such and which float on the boiling medium on account of lower specific gravity. Such absorbing liquids can be filled into sealed float vessels.

It is further within the scope of the invention to use, as regulating elements, moderating solid bodies or liquids as well as special fuel elements which likewise permit regulating the power output of a reactor in dependence upon the immersing depth.

Figure 10:
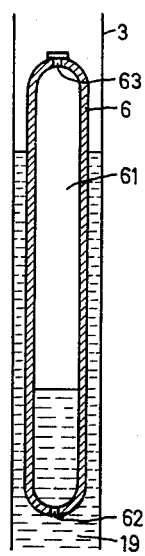
FIG. 10 shows a float member applicable in the devices according to the other illustrations.

The immersing depth of the floating body in the condensate 19 can be given a fixed adjustment from the outset by proper selection of the ratio of weight to volume of these bodies. According to FIG. 10, however, the immersing depth of the floating regulating elements can also be made adjustable by means of a variable weighting load. For example, according to FIG. 10, the float body 6 is provided with two openings 62 and 63 of which the opening 63 can be closed. The condensate 19 then enters into the interior space 61 of the float 6 until, and up to such a height, that the opening 63 is gas-tightly closed. The weighting can also be effected by filling suitable solid bodies into the interior of the float.

The performance properties of the above-described method and apparatus according to my invention are briefly summarized as follows:

(1) The regulation of the reactor power output is effected completely automatically without interposing any electronic circuits.

(2) The regulation simultaneously stabilizes the power as well as the temperature level, provided the reactor system is kept at constant pressure.

(3) The power can be adjusted within a wide range by an extremely simple actuation, namely by means of the valve 9 of the injection line 81, and/or by means of the steam-outlet valve 20, and/or by means of the coolant-admitting throttle valve 2, 21, 25.

(4) The regulating system, upon occurrence of power increases due to disturbance, returns the power to the datum level with great rapidity.

(5) The regulating device endows the reactor with the characteristic of a negative bubble coefficient. In a liquid-cooled reactor, this causes a negative reactivity variation to occur before boiling can take place in the other fuel elements:

(a) when the outlet temperature of the coolant increases, (b) when the power increases, (c) when the pressure of the reactor system drops, or (d) when the main coolant pump fails or operates insufficiently.

The safety and reliability of a reactor equipped with such a regulating system is secured by virtue of the following properties:

(a) When the injection of coolant fails, the absorber element 6 is pressed into shut-down position.

(b) When the float becomes leaky, the absorber element likewise drops to shut-down position.

(c) The absorber float can rise only at limited speed even if the coolant level rises rapidly, because the volume upwardly protruding out of the coolant level is relatively small. On the other hand, the downward motion of the float may approach gravity velocity so that abrupt disturbances are compensated with extreme rapidity.

(d) In the event of excessive injection of coolant by faulty attendance, no positive reactivity, as may cause unlimited increase in power, is produced. The reactor is merely controlled toward increased power output. The maximum injection capacity can be so adjusted that the maximum of the power increase is only slightly above rated full power.

It will be obvious to those skilled in the art, upon studying this disclosure, that my invention affords a great variety of modifications and variations and hence can be given embodiments other than particularly illustrated and described here, without departing from the essential features of my invention and within the scope of the claims annexed hereto.

I claim:

1. The method of regulating a nuclear reactor having a core with fuel channels and movable neutron-absorptive floatable control means, which comprises causing coolant liquid to boil to steam in a selected fuel channel at a given operating condition below full power rating of the reactor, said channels being separately cooled from the remainder of the core, condensing the steam to coolant liquid in a chamber separate from said fuel channel, and variably displacing the control means into various degrees of immersed condition within said chamber relative to the core in dependence upon occurrence of boiling in said channel.

2. The method of regulating a nuclear reactor having a core with fuel channels and movable neutron-absorptive floatable control means, which comprises causing coolant liquid to boil to steam in a selected fuel channel at a given operating condition below full power rating of the reactor, said channels being separately cooled from the remainder of the core, condensing the steam to coolant liquid in a chamber separate from said fuel channel, and displacing the control means into various degrees of immersed condition to a variable immersion depth in said chamber relative to said core in response to the volume and pressure of the steam generated by boiling in said fuel channel.

3. The method of regulating a nuclear reactor having a core with fuel channels and movable absorber floatable control means, which comprises causing coolant liquid to boil to steam in a selected fuel channel at a given operating condition below full power rating of the reactor, said channels being separately cooled from the remainder of the core, condensing the steam coolant liquid in a chamber separate from said fuel channel, displacing the control means into various degrees of immersed condition to a variable immersion depth in said chamber relative to said core by vapor pressure due to boiling of the coolant, and controlling the displacement of the control means in said chamber by withdrawing an adjustable proportion of the steam quantity.

4. The method of regulating a nuclear reactor having a core with fuel channels and movable absorber floatable control means, which comprises causing coolant liquid to boil to vapor in a selected fuel channel at a given operating condition below full power rating of the reactor, said channels being separately cooled from the remainder of the core, condensing the vapor to coolant liquid in a chamber separate from said fuel channels and displacing the control means into various degrees of immersed condition to a variable immersion depth in said chamber relative to said core by vapor pressure due to boiling of the coolant, and controlling the displacement of the control means in said chamber by supplying an adjustable quantity of liquid coolant into the vapor to thereby condense part of the vapor.

5. The method of regulating a nuclear reactor having a core with fuel channels and movable neutron-absorptive floatable control means, which comprises causing coolant liquid to boil to vapor in a selected fuel channel at a given operating condition below full power rating of the reactor, said channels being separately cooled from the remainder of the core, condensing the vapor to coolant liquid in a chamber separate from said fuel channels and displacing the control means into various degrees of immersed condition to a predetermined immersion depth relative to said core by vapor pressure due to boiling of the coolant, and controlling the displacement of the control means within said chamber by varying the quantity of coolant supplied per unit of time to said fuel channel.

6. Apparatus for regulating a nuclear reactor having a core with fuel channels and movable neutron-absorptive floatable control means, comprising a selected fuel channel separately cooled from the remainder of the core and having liquid coolant supply means adapted to cause boiling of coolant to vapor in said channel at a given operating condition below full power rating of the reactor, a pressure chamber separate from and communicating with said fuel chamber to be subjected to varying vapor pressure due to boiling of coolant in said channel, one of said control means being float of neutron-absorptive material floatable in said coolant and disposed in said chamber and movable toward fully immersed position relative to the reactor core in response to the vapor pressure in said chamber.

7. Apparatus for regulating a nuclear reactor having a core with fuel channels and movable absorptive control means, comprising a selected fuel channel having liquid coolant supply means adapted to cause boiling of coolant in said channel at a given operating condition below full power rating of the reactor, a vapor chamber communicating with said fuel channel to be subjected to varying vapor pressure due to boiling of coolant in said channel, one of said movable control means forming a float in said vapor chamber so as to be immersed in said core in accordance with pressure-responsive changes of the condensate level in said chamber.

8. Reactor regulating apparatus according to claim 7, comprising an adjustable escape valve connected with said pressure chamber for controlling the regulating operation.

9. In reactor regulating apparatus according to claim 7, said coolant supply means comprising an adjustable throttle for controlling the amount of liquid coolant entering said selected fuel channel.

10. Reactor regulating apparatus according to claim 7, comprising coolant injection means in said chamber, and a coolant supply line connected to said injection means and having a control valve adjustable from the outside of the reactor for controlling the coolant condensation in said chamber.

11. Reactor regulating apparatus according to claim 7, comprising nuclear fuel means located in the lower portion only of said selected fuel channel, said vapor chamber being formed by the upper portion of said selected channel, said coolant supply means being connected to the bottom end of said channel.

12. Reactor regulating apparatus according to claim 7, comprising a first nuclear fuel element in said selected fuel channel, a second nuclear fuel element located in said channel behind said first element relative to the coolant flow direction, said vapor chamber being formed by the interior of said second fuel element.

13. Reactor regulating apparatus according to claim 7, comprising a nuclear fuel element in said selected channel, said channel having a portion located behind said fuel element in the coolant flow direction and forming said vapor chamber, and centrifugal vapor-from-liquid separator means comprising a helical guide vane structure mounted in said selected channel between said fuel element and said vapor chamber.

14. Reactor regulating apparatus according to claim 7, comprising adjustable weight means on said float for controlling the immersion depth of said control means.

15. Reactor regulating apparatus according to claim 7, comprising sensor means coactively associated with said float and operable by motion of said float for transmitting a signal corresponding to the relative amount of immersion of said float.

16. Apparatus for regulating a nuclear reactor having a core with fuel channels and movable absorptive control means, comprising a selected fuel channel having liquid coolant supply means adapted to cause boiling of coolant in said channel at a given operating condition below full power rating of the reactor, a vapor chamber extending vertically in the reactor core in parallel relation to said selected fuel channel and communicating with the top of said channel to be subjected to vapor pressure due to occurrence of coolant boiling in said channel, one of said control means being disposed in said chamber and movable toward fully immersed position relative to the reactor core in response to the vapor pressure in said chamber.

17. Reactor regulating apparatus according to claim 16, comprising a group of vertical tubes communicating with said vapor chamber and containing coolant liquid, whereby the level changes of the coolant liquid in said tubes are proportional to those of the coolant condensate in said chamber.

18. With a nuclear reactor having a core with vertical fuel channels and a coolant plenum chamber above the core and movable regulator means floatingly immersible in the core for regulating the nuclear reaction, the combination of regulating apparatus comprising a selected one of said fuel channels, liquid-coolant supply means communicating with the bottom end of the crannel adapted to cause boiling of coolant to vapor in said channel at a given operating condition below full power rating of the reactor, a vertical vapor chamber separate from and communicating with the top end of said selected channel and extending parallel thereto in said core for collecting condensed coolant formed from the vapor, said vapor chamber having its bottom in communication with said plenum chamber, one of said movable regulator means forming a neutron absorbent float in said vapor chamber so as to be immersed within the coolant liquid in said core at variable depths in accordance with pressure-responsive changes of the level of the condensed coolant in said chamber.

19. Apparatus for regulating a nuclear reactor having a core with fuel channels and movable absorptive control means, comprising a selected one of said fuel channels having liquid coolant supply means adapted to cause boiling of coolant in said channel at a given operating condition below full power rating of the reactor, a group of vertical tubes extending in said core parallel to said selected channel, a vertical pressure-control chamber communicating at top and bottom respectively with said selected channel and with said tubes whereby a level of liquid adjusts itself in said tubes and in said chamber depending upon the vapor pressure above said level in said chamber, said chamber having pressure adjusting means, and regulatory neutron absorber floats disposed in said respective tubes so as to become actively immersed in said core in dependence upon said level and in response to vapor pressure due to boiling in said selected channel and adjustable by said pressure adjusting means.

20. Reactor regulating apparatus according to claim 19, comprising a vessel structure which forms said vapor chamber and is located outside of said reactor core, and conduit means connecting said vessel structure with said tubes inside said core.

References Cited by the Examiner
UNITED STATES PATENTS

| | | | |
|---|---|---|---|
| 2,949,414 | 8/1960 | Ransohoff et al. | 60—108 |
| 2,982,712 | 5/1961 | Heckman | 176—20 |
| 2,999,059 | 9/1961 | Treshow | 176—42 |

FOREIGN PATENTS 1,211,272  10/1959  France.

CARL D. QUARFORTH, *Primary Examiner.*

REUBEN EPSTEIN, *Examiner.*